Dec. 2, 1958  J. N. FRANZ  2,862,552
COLLAPSIBLE PROJECTION SCREEN
Filed Aug. 6, 1956  2 Sheets-Sheet 1
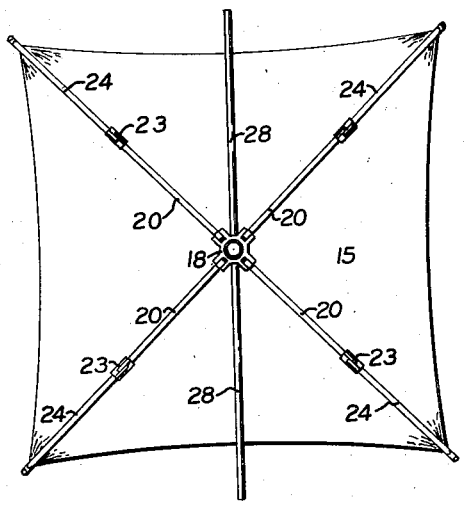
Fig. 1
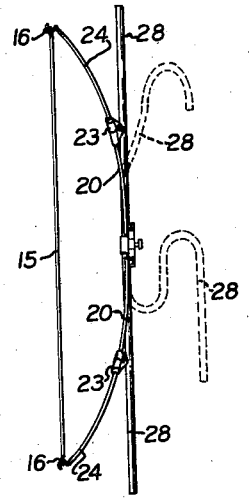
Fig. 2
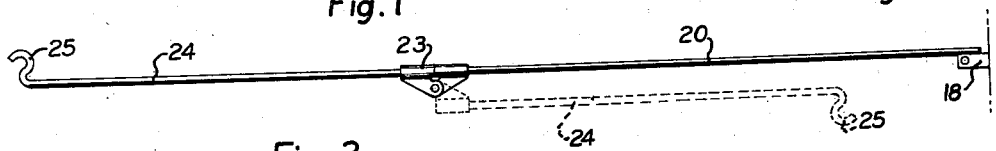
Fig. 3
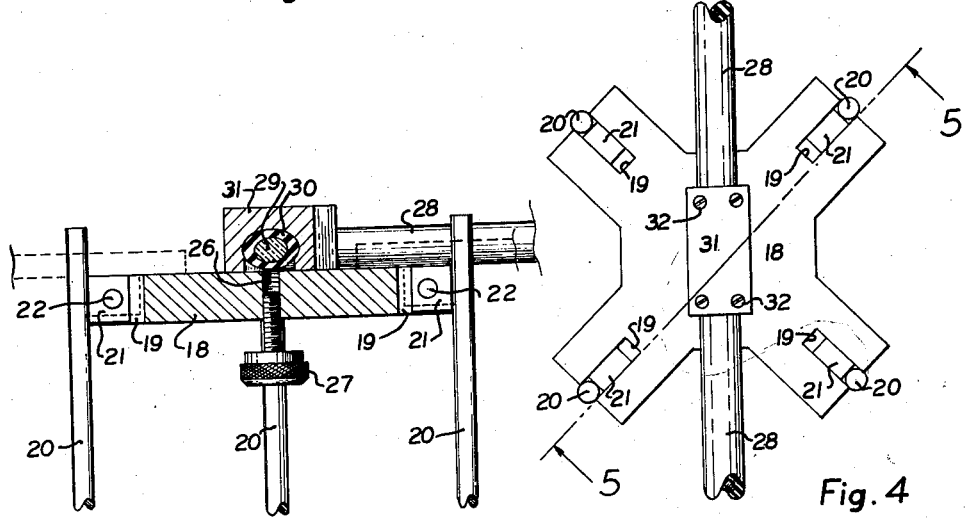
Fig. 5
Fig. 4
INVENTOR.
James N. Franz.
BY 
ATTORNEY.

Dec. 2, 1958  J. N. FRANZ  2,862,552
COLLAPSIBLE PROJECTION SCREEN
Filed Aug. 6, 1956  2 Sheets-Sheet 2
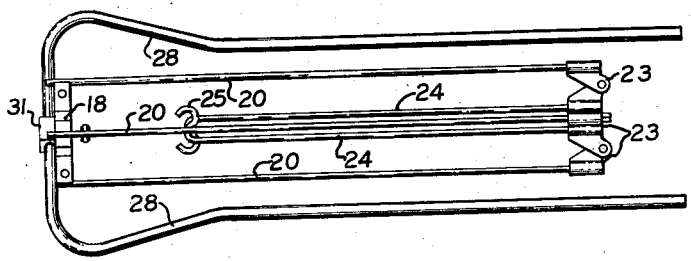
Fig. 6
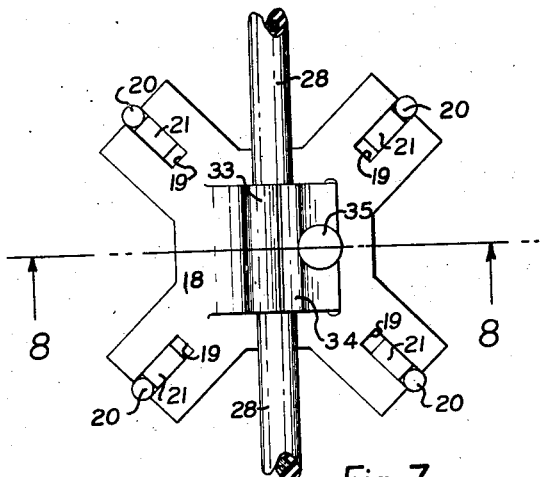
Fig. 7
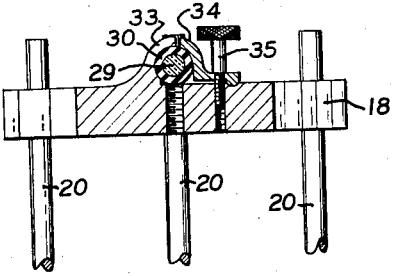
Fig. 8
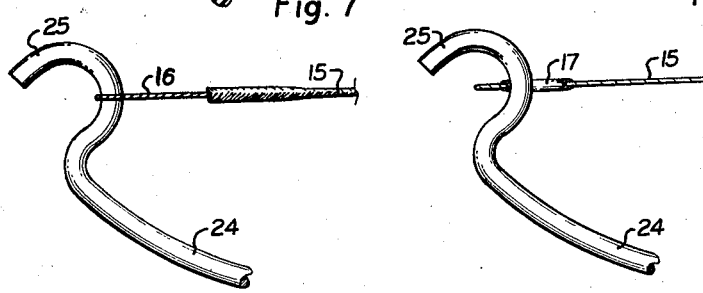
Fig. 9
Fig. 10
INVENTOR.
James N. Franz.
BY
ATTORNEY.

United States Patent Office 2,862,552
Patented Dec. 2, 1958

2,862,552

COLLAPSIBLE PROJECTION SCREEN

James N. Franz, Denver, Colo.

Application August 6, 1956, Serial No. 602,230

5 Claims. (Cl. 160—368)

This invention relates to screens designed for the display and viewing of material projected thereon, as from transparencies, and the like, and has as an object to provide a novel and improved screen readily collapsible to compact form and conveniently extensible to use condition.

A further object of the invention is to provide a novel and improved collapsible projection screen expediently adaptable to use in mounted relation with any of a wide variety of available supports.

A further object of the invention is to provide a novel and improved collapsible projection screen characterized by a smooth, taut, plane screen area when extended to use condition.

A further object of the invention is to provide a novel and improved operative combination of a foldable screen and a collapsible frame in and as a portable projection screen.

A further object of the invention is to provide a novel and improved construction and operative combination of elements constituting a collapsible projection screen.

A further object of the invention is to provide a novel and improved collapsible frame assembly readily manipulable for the extension and support of a projection screen.

A further object of the invention is to provide a novel and improved collapsible projection screen that is simple and inexpensive of production in a wide range of sizes, that is amenable to use in diverse situations, that is light of weight in proportion to extended size, and that is highly efficient in attainment of the ends for which designed.

With the foregoing and other objects in view, my invention consists in the construction, arrangement, and operative combination of elements as hereinafter set forth, pointed out in my claims, and illustrated by the accompanying drawings, in which:

Figure 1 is a rear elevation of a typical embodiment of the invention as extended and assembled ready for mounting in position of practical use.

Figure 2 is a side elevation of the organization according to Figure 1, broken lines in the view indicating alternative positions to which an element of the assembly may be adjusted.

Figure 3 is a side elevation, on a relatively enlarged scale, of an arm member utilized in multiple in the organization according to the preceding views, the broken line showing representing an alternative position to which an element of the member may be folded.

Figure 4 is a rear face elevation, on a further enlarged scale, of a fitting and associated elements comprised in the organization according to Figures 1 and 2, certain portions of one of the illustrated elements being broken away to conserve space.

Figure 5 is a section through, and substantially on the indicated line 5—5 of, the arrangement according to Figure 4, portions of the elements comprised in the view being broken away to conserve space.

Figure 6 is an elevation, on substantially the same scale as Figure 3, of the frame organization comprised in the invention as collapsed to compact, portable condition.

Figure 7 is a rear face elevation, similar to Figure 4, of an alternative fitting organization within the contemplation of the invention.

Figure 8 is a section through, and substantially on the indicated line 8—8 of Figure 7, with elements of the showing broken away to conserve space.

Figure 9 is a fragmentary, detail view, on a relatively enlarged scale, of the means represented in Figures 1 and 2 for operatively engaging the screen member with the frame.

Figure 10 is a view similar to Figure 9 typifying an alternative arrangement within the contemplation of the invention for operatively interengaging the screen and frame features of the improvement.

The popularity and extensive use of portable projection screens are evidenced by the various types and constructions of such screens commonly available. However, the known types and constructions of such screens are in general less than satisfactory for reasons of excessive bulk, awkward size, difficulty of manipulation into and out of use condition, requirements of support for use, and the like, hence the instant invention is directed to the provision of a novel and improved such screen eliminative of many of the deficiencies of the known analogous devices and characterized by inherent advantages not hitherto realized.

The improved screen of the invention consists of two independent components, a screen member, per se, and a unitary, foldable frame assembly cooperable with and to stretch, mount, and support the screen member.

The screen member of the improvement is a rectangular sheet 15, expediently although not necessarily square, of any appropriate and preferred flexible, opaque material, such as fabric, susceptible of being rolled or folded to compact form without the development of creases permanently distorting its surface when stretched flat under the influence of diagonally and outwardly directed forces applied to its corners. In a desired size and particular rectangular proportion, the sheet 15 is bounded by hemmed or selvage margins and is worked at each of its corners for engagement with an end of a frame member, such working consisting of a flexible loop 16 secured to the sheet corner, as in Figures 1, 2 and 9, a grommet 17 set into the sheet corner, as in Figure 10, or a clip or inwardly-opening pocket, not shown, attached to the sheet corner in accordance with established and well-known techniques.

The frame assembly of the invention is centered in a rigid fitting 18 of flat, plate form, produced from any suitable material, such as light-weight metal, in any expedient manner, to present four like, angularly-related notches 19 intersecting the plate thickness and opening through the plate margin in alignment with the diagonals of the sheet 15 wherewith the frame is to be associated. In each of the notches 19 the said fitting 18 hingedly mounts the inner end of a compound arm, hereinafter more specifically described, characterized by a stiffly-resilient rod portion 20, in a manner to extend at times outwardly from and in substantially the plane of said fitting and at other times to extend from and substantially perpendicular to the fitting. The said compound arms, their rod portions 20, and the manner of their attachment to the fitting 18 being identical, but one thereof need be described. The rod portion 20 of each compound arm is a straight, preferably cylindrical, element of strong, stiffly-resilient material, such as metal, having a length somewhat exceeding one-fourth the diagonal of the stretched sheet 15, and inwardly adjacent its end connectible with the fitting 18 each said rod portion 20 fixedly mounts a rigid ear 21 projecting radially therefrom in a size and thickness receivable in a notch 19. The ear 21 is centrally apertured for pivotal coaction with a pin 22 fixedly and perpendicularly traversing the notch 19, so that, with said ear engaged on the pin 22 and within the notch 19 the rod portion 20 is mounted to swing in a plane radial of the fitting 18 to a position substantially coplanar with said plate, broken lines in Figure 5, determined by engagement of the free inner end of said rod portion against the face of the fitting inwardly adjacent the notch, and alternatively to a position, full lines in Figure 5, wherein it stands substantially perpendicular to the plane of the fitting. By virtue of the arrangement of the notches 19 and the mounting of a rod portion 20 in each of said notches as above set forth, the said rod portions when extended into coplanar relation with the fitting align with the diagonals of the sheet 15 when said fitting is centered relative to the distended sheet. Each rod portion 20 engages at its end remote from the fitting 18 with one element of a knuckle joint 23 which mounts in its other element a stiffly-resilient rod portion 24 complementary to the rod portion 20 and therewith completing the compound arm organization utilized in multiple in the frame assembly. The knuckle joint 23 so connects the rod elements 20 and 24 of each compound arm as to lock said elements in alignment in one direction of relative articulated travel and to accommodate such relative articulated travel in the opposite direction, the hinge axis of the knuckle joint paralleling that of the pin 22 and lying on the same side of the rod portion 20 as said pin, so that when the rod portion 20 is swung inwardly to stand perpendicular to the plane of the fitting 18 the rod portion 24 may be folded inwardly along and substantially parallel to its associated rod portion 20 to stand therewith substantially perpendicular to the fitting, as in Figure 6, and when the said rod portion 20 is extended and held radially of the fitting in substantially the plane thereof the associated rod portion 24 may be swung into alignment therewith and held by the knuckle joint against overtravel relative to the portion 20, as in Figure 3. Each compound arm comprised from the rod portions 20 and 24 has, when extended to alignment of said portions, a length exceeding that of the half diagonal of the distended sheet 15, and each of the said rod portions 24 terminates in an open hook 25, or a functional equivalent, quickly and detachably connectible with a corner of the sheet 15, as through engagement with a loop 16 or grommet 17 thereof, in which arrangement and proportioning of the frame assembly elements a flexing or bowing of the compound arms against the limiting action of their knuckle joints and their attachment to the fitting 18 is necessary to engage the respective hooks 25 thereof with the four corners of the sheet 15, which flexure or bowing of the extended compound arms, represented by Figure 2, acts in an obvious manner to stretch and tauten the sheet so mounted on the frame assembly.

The sheet 15 detachably engaged with and stretched by the frame assembly as shown in Figures 1 and 2 and above described is conditioned for use as a projection screen when supported in a substantially vertical plane and opposed to projection apparatus, and an important feature of the invention is the means provided in association with the frame assembly for expedient and adaptable support of the sheet in its position of use. Obviously, when camera tripods and equivalent mounts are available, connection of the fitting 18 therewith provides suitable support for the screen, and for such purpose a threaded hole 26 is provided centrally of the fitting 18 to open through the face of the latter remote from the mounted sheet 15 in coaction with a clamp stud 27 adjustable therein and removable therefrom, whereby to provide for clamping of the fitting by means of the stud 27 to any appropriate element of an available mount, or for attachment of the fitting by means of the hole 26, the stud 27 being removed, to the threaded stud conventionally present on camera tripods. Supplemental to the foregoing and for use alternative thereto when specific mounts are unavailable, an elongated, stiffly-pliant member 28, such as a ductile metal rod 29 encased in a non-rigid cover 30 of rubber, or the like, is provided in an appropriate length, preferably as great or greater than the width of the sheet 15, and is adjustably clamped to and across the face of the fitting 18 adjacent to the mounted sheet 15. As shown in Figures 4 and 5, a U-shaped clip 31 embraces a midportion of the member 28 and engages the fitting 18 whereto it is secured by screws 32 to clamp said member to the fitting with provision for length adjustment of said member relative to the fitting, while in Figures 7 and 8 is shown an alternative adjustable connection between the fitting 18 and member 28 which consists of an arcuately-undercut rib 33 formed integrally with and to outstand from the face of the fitting for partial reception of the member 28 and a complementary clamp clip 34 separable from and rockable on the fitting 18 in opposition to the rib 33 and reactive to manipulations of a clamp screw 35 engaged therethrough and with the fitting to adjustably secure said member in said rib and thereby to the fitting. As represented by broken lines in Figure 2, the member 28 may be twisted, bent, looped, and otherwise shaped at either or both sides of its attachment to the fitting 18 to provide hooks, pedestals, and like forms appropriate for engagement with furniture, finish trim, and the like, for the desired support of the frame assembly and the associated sheet 15 in position for use of the latter as a screen, and said member 28 may be shifted relative to the fitting 18 to vary its length relation therewith and to thereby provide for its manipulation and use as a support in any conceivable situation.

With the sheet 15 detached from the frame assembly, said sheet may be rolled or folded to compact form and the freed frame assembly is then contracted to the compact condition represented by Figure 6 through simple interfolding of the compound arm elements and flexing of the member 28 to lie over and along the folded arms, in which condition the complete screen organization is reduced in size and compacted to a form convenient of transportation and storage.

Since changes, variations, and modifications in the form, construction, and particular arrangement of the elements shown and described may be had without departing from the spirit of my invention, I wish to be understood as being limited solely by the scope of the appended claims, rather than by any details of the illustrative showing and foregoing description.

I claim as my invention:

1. In a collapsible projection screen having a rectangular flexible sheet, a foldable unitary frame assembly cooperable with said sheet to spread, tension and support the same, said assembly comprising a rigid fitting, stiffly-resilient arms hinged to said fitting for adjustment relative thereto between dispositions substantially perpendicular to the plane of the fitting and extensions radially from and substantially in the plane of said fitting, said arms being angularly spaced when extended to register with and exceed in length the half-diagonals of the sheet, means at the free ends of said arms detachably engageable with corresponding corners of the sheet upon flexure of the extended arms, and means carried by said fitting in foldable association therewith variously manipulable for coaction with diverse available supports as a mount for the extended frame and associated sheet, wherein said fitting is a plate-like member formed with like notches opening radially through the periphery thereof in an angular spacing corresponding with that of the half-diagonals of the sheet, an ear loosely receivable in any one of said notches is fixed to and projects radially from each of said arms inwardly adjacent the inner end thereof, and a pin fixed transversely of each said notch through an ear received therein hingedly mounts the associated arm on the fitting for engagement of the inner end extension of the arm with a face of the fitting as a stop limiting angular travel of the arm relative to the fitting in one direction when the arm is substantially coplanar with the fitting.

2. In a collapsible projection screen having a rectangular flexible sheet, a foldable unitary frame assembly cooperable with said sheet to spread, tension and support the same, said assembly comprising a rigid fitting, stiffly-resilient arms hinged to said fitting for adjustment relative thereto between dispositions substantially perpendicular to the plane of the fitting and extensions radially from and substantially in the plane of said fitting, said arms being angularly spaced when extended to register with and exceed in length the half-diagonals of the sheet, means at the free ends of said arms detachably engageable with corresponding corners of the sheet upon flexure of the extended arms, and means carried by said fitting in foldable association therewith variously manipulable for co-action with diverse available supports as a mount for the extended frame and associated sheet, wherein each of said arms is constituted as an inner, rod-like member hinged to the fitting adjacent its inner end for limitation of its relative arcuate travel in one direction to a disposition substantially coplanar with the fitting, an outer rod-like member, and a knuckle joint coupling the inner end of said outer member to the outer end of the inner member with the pivotal axis of said joint parallel to the hinge axis connecting the arm to the fitting at the side of the arm adapted to fold toward the fitting.

3. In a collapsible projection screen having a rectangular flexible sheet, a foldable unitary frame assembly cooperable with said sheet to spread, tension and support the same, said assembly comprising a rigid fitting, stiffly-resilient arms hinged to said fitting for adjustment relative thereto between dispositions substantially perpendicular to the plane of the fitting and extensions radially from and substantially in the plane of said fitting, said arms being angularly spaced when extended to register with and exceed in length the half-diagonals of the sheet, means at the free ends of said arms detachably engageable with corresponding corners of the sheet upon flexure of the extended arms, and means carried by said fitting in foldable association therewith variously manipulable for co-action with diverse available supports as a mount for the extended frame and associated sheet, wherein the means for mounting the frame in engagement with available supports includes a threaded hole centrally of the fitting and a clamp screw removable and replaceable in co-action therewith.

4. In a collapsible projection screen having a rectangular flexible sheet, a foldable unitary frame assembly cooperable with said sheet to spread, tension and support the same, said assembly comprising a rigid fitting, stiffly-resilient arms hinged to said fitting for adjustment relative thereto between dispositions substantially perpendicular to the plane of the fitting and extensions radially from and substantially in the plane of said fitting, said arms being angularly spaced when extended to register with and exceed in length the half-diagonals of the sheet, means at the free ends of said arms detachably engageable with corresponding corners of the sheet upon flexure of the extended arms, and means carried by said fitting in foldable association therewith variously manipulable for co-action with diverse available supports as a mount for the extended frame and associated sheet, wherein the means for mounting the frame in engagement with available supports includes an elongated, stiffly-pliant, rod-like member adjustably carried by and across the side of the fitting adapted to face the mounted sheet and extending at each end beyond the fitting.

5. In a collapsible projection screen having a rectangular flexible sheet, a foldable unitary frame assembly cooperable with said sheet to spread, tension and support the same, said assembly comprising a rigid fitting, stiffly-resilient arms hinged to said fitting for adjustment relative thereto between dispositions substantially perpendicular to the plane of the fitting and extensions radially from and substantially in the plane of said fitting, said arms being angularly spaced when extended to register with and exceed in length the half-diagonals of the sheet, means at the free ends of said arms detachably engageable with corresponding corners of the sheet upon flexure of the extended arms, and means carried by said fitting in foldable association therewith variously manipulable for co-action with diverse available supports as a mount for the extended frame and associated sheet, wherein the means for mounting the frame in engagement with available supports includes an elongated, stiffly-pliant, rod-like member diametrically of the side of the fitting adapted to face the mounted sheet in extension at each end beyond the fitting, and a clamp adjustably securing said member to the fitting.

References Cited in the file of this patent

UNITED STATES PATENTS

| | | |
|---|---|---|
| 147,594 | Bird | Feb. 17, 1874 |
| 150,701 | Myers | May 12, 1874 |
| 713,381 | Battersby | Nov. 11, 1902 |
| 1,860,323 | Ebeling | May 24, 1932 |
| 1,869,060 | Harter | July 26, 1932 |
| 2,492,529 | Kaplan | Dec. 27, 1949 |
| 2,510,198 | Tesmer | June 6, 1950 |
| 2,571,382 | Raven | Oct. 16, 1951 |